(12) United States Patent
Hanisch

(10) Patent No.: US 12,534,049 B2
(45) Date of Patent: Jan. 27, 2026

(54) VEHICLE SECURING ARRANGEMENT

(71) Applicant: AUDI AG, Ingolstadt (DE)

(72) Inventor: Thomas Hanisch, Dollnstein (DE)

(73) Assignee: AUDI AG, Ingolstadt (DE)

( * ) Notice: Subject to any disclaimer, the term of this patent is extended or adjusted under 35 U.S.C. 154(b) by 14 days.

(21) Appl. No.: 18/716,256

(22) PCT Filed: Dec. 1, 2022

(86) PCT No.: PCT/EP2022/084104
§ 371 (c)(1),
(2) Date: Jun. 4, 2024

(87) PCT Pub. No.: WO2023/151846
PCT Pub. Date: Aug. 17, 2023

(65) Prior Publication Data
US 2025/0033606 A1 Jan. 30, 2025

(30) Foreign Application Priority Data
Feb. 8, 2022 (DE) .......................... 102022102913.1

(51) Int. Cl.
*B60T 7/06* (2006.01)
(52) U.S. Cl.
CPC ..................................... *B60T 7/06* (2013.01)
(58) Field of Classification Search
None
See application file for complete search history.

(56) References Cited

U.S. PATENT DOCUMENTS 6,082,219 A   7/2000   Wolpert

FOREIGN PATENT DOCUMENTS

| DE | 1944785  | A1 | * | 3/1970 | |
| DE | 19606427 | A1 |   | 8/1997 | |
| DE | 19706692 | C1 | * | 6/1998 | ............. B60K 23/00 |
| DE | 19757832 | A1 |   | 7/1998 | |
| DE | 10046634 | A1 |   | 3/2002 | |

(Continued)

OTHER PUBLICATIONS

International Preliminary Report on Patentability issued on Aug. 22, 2024, in corresponding International Application No. PCT/EP2022/084104, 9 pages.

(Continued)

*Primary Examiner* — Vicky A Johnson
(74) *Attorney, Agent, or Firm* — Maier & Maier, PLLC

(57) ABSTRACT

A vehicle securing arrangement, with a brake pedal which is articulated on a pedal bracket and which is connected to a braking device in a force-transmitting manner via an actuating rod. The braking device is arranged on a front side, relative to the vehicle, of a braking device support structure and the pedal bracket is arranged on a rear side, relative to the vehicle, of a pedal bracket support structure which is spaced from the braking device support structure by a longitudinal offset. The securing arrangement has at least one spacer which bridges the longitudinal offset between the brake device support structure and the pedal bracket support structure. The spacer is connected to a front joint, relative to the vehicle on the braking device, and to a rear joint, relative to the vehicle on the pedal bracket.

17 Claims, 3 Drawing Sheets

(56) References Cited

FOREIGN PATENT DOCUMENTS

DE      10011930 B4    11/2004
EP       3456610 A1     3/2019
KR   1020140072262 A    6/2014

OTHER PUBLICATIONS

Office Action issued on Jan. 13, 2023, in corresponding German Application No. 10 2022 102 913.1, 10 pages.
International Search Report issued on Feb. 28, 2023, in corresponding International Application No. PCT/EP2022/084104, 17 pages.
Examination Report issued on May 9, 2025, in corresponding European Application No. 22 829 551.5, 10 pages.

* cited by examiner

VEHICLE SECURING ARRANGEMENT

FIELD

The invention relates to a vehicle securing arrangement.

BACKGROUND

A foot pedal assembly is mounted in the driver's side footwell on the front wall of a vehicle that borders the vehicle interior at the front, to which, among other things, a brake pedal is pivotably connected. The brake pedal is connected to a braking device via an actuating rod. This is positioned on the front side of the bulkhead, facing away from the vehicle interior. The actuating rod is guided from the braking device through a bulkhead passage to the rear of the vehicle into the vehicle interior and is connected there to a connection point on the brake pedal side in a force-transmitting manner. The braking device is clamped to the foot pedal mechanism via screw connections in a standard vehicle securing arrangement with the bulkhead in between.

In contrast, in a generic vehicle securing arrangement, due to structural conditions, the braking device is no longer directly connected to the pedal bracket with the bulkhead in between. Rather, the braking device is arranged on a front side of a braking device support structure, relative to the vehicle, in particular a bulkhead, while the pedal bracket is arranged on a rear side, relative to the vehicle, of a pedal bracket support structure separate from the bulkhead. The brake device support structure and the pedal bracket support structure are spaced apart from each other by a longitudinal offset. In prior art, the brake device support structure and the pedal bracket support structure must be structurally stable and material-intensive with a correspondingly large sheet thickness so that the actuation forces generated when the brake is applied can be reliably absorbed.

From DE 100 11 930 B4 a device on motor vehicles for absorbing kinetic energy in the event of a vehicle impact is known. From EP 3 456 610 A1 a force transmission structure in a vehicle is known.

SUMMARY

The object of the invention is to provide a vehicle securing arrangement in which, in comparison to the prior art, a reliable connection of the braking device and the pedal bracket is possible in a structurally simple manner.

The invention is based on a vehicle securing arrangement in which a brake pedal is hinged to a pedal bracket. The brake pedal is connected to a braking device via an actuating rod. The braking device can be arranged on a front side, relative to the vehicle, of a braking device support structure, in particular a bulkhead. In contrast, the pedal bracket can be arranged on a rear side, relative to the vehicle, of a pedal bracket support structure which is spaced from the brake device support structure via a longitudinal offset. It is contemplated that, in an exemplary embodiment, the securing arrangement has at least one spacer. This bridges the longitudinal offset between the brake device support structure and the pedal bracket support structure. The spacer is connected to the braking device at a joint at the front relative to the vehicle, preferably a screw point. In addition, the spacer is connected to a joint at the rear relative to the vehicle, in particular a screw point, on the pedal bracket. Especially when the brake pedal is actuated, the spacer acts as a rigid tension anchor in the longitudinal direction of the vehicle, which provides a force path between the braking device and the pedal bracket in which a compensating force builds up that counteracts the actuating force. In this way, the load on both the pedal bracket support structure and the brake device support structure is reduced. Therefore, the two supporting structures can be manufactured with reduced sheet thickness.

In a preferred embodiment, the vehicle securing arrangement is designed as follows with regard to a frontal crash: In such a frontal crash, a crash force directed towards the rear of the vehicle acts on the braking device. This puts pressure on the spacer. In contrast to a tensile load, the spacer yields under a compressive load. This can prevent the spacer from blocking in the event of a crash. In the event of a crash, the spacer is therefore not displaced towards the vehicle interior, or at least is displaced to a lesser extent.

In a technical implementation of the crash-active spacer mentioned above, it can act as a deformation element that can be deformed in the longitudinal direction of the vehicle in a frontal crash and that dissipates crash energy while deforming.

In a structurally simple embodiment, the spacer can be a piston-cylinder unit, namely with a cylinder sleeve and a piston guided telescopically therein. The piston of the spacer can be connected to the one joint via its piston rod, while the cylinder sleeve can be connected to the other joint.

In the event of a crash, the piston can be adjusted in one pressure direction along a crash stroke distance within the cylinder sleeve. It is particularly preferred if, in the event of a crash, the piston is moved along the crash stroke with deformation of the piston and/or the cylinder sleeve. In this case, the crash stroke distance can only be released when the acting crash force exceeds a predefined limit value (break-away force). During normal driving, however, the piston can be pressed in the pulling direction with the compensating force against a mechanical stroke stop on the cylinder sleeve. During normal driving, the piston is therefore fixed in the cylinder sleeve.

For a perfect force transmission, it is preferred if the spacer is supported with its front sides on the pedal bracket support structure and on the brake device support structure. The braking device can be clamped to the spacer at the screw point at the front relative to the vehicle, with the braking device support structure in between. In the same way, the pedal bracket can be clamped to the spacer at the rear screw point of the vehicle with the pedal bracket support structure in between.

If the spacer is designed as a piston-cylinder unit, the following assembly state can result: The pedal bracket can be clamped to a cylinder base of the cylinder sleeve of the spacer at the screw point at the rear relative to the vehicle, with the pedal bracket support structure in between. In the same way, the braking device can be screwed to a piston rod head of the spacer at the screw point at the front relative to the vehicle, with the braking device support structure in between. In this case, during normal driving operation, the piston rests against an end stop of the cylinder sleeve on the piston rod side, which prevents piston movement when the spacer is subjected to tensile load (i.e. during normal brake pedal operation).

In addition, the piston can be in a form-fitting connection with the sleeve wall of the cylinder sleeve. In this way, a crash stroke movement of the piston is inhibited during normal driving. Only when a sufficiently large crash force is applied can the positive connection be released and the crash stroke released. To form the positive connection, the piston can have a circumferential annular groove into which a shaped threshold of the sleeve wall of the cylinder sleeve protrudes, for example, in a form-fitting and/or contour-adapted manner.

BRIEF DESCRIPTION OF THE FIGURES

An exemplary embodiment of the invention is described below by means of the appended figures. In the figures.

DETAILED DESCRIPTION

Figure 1:
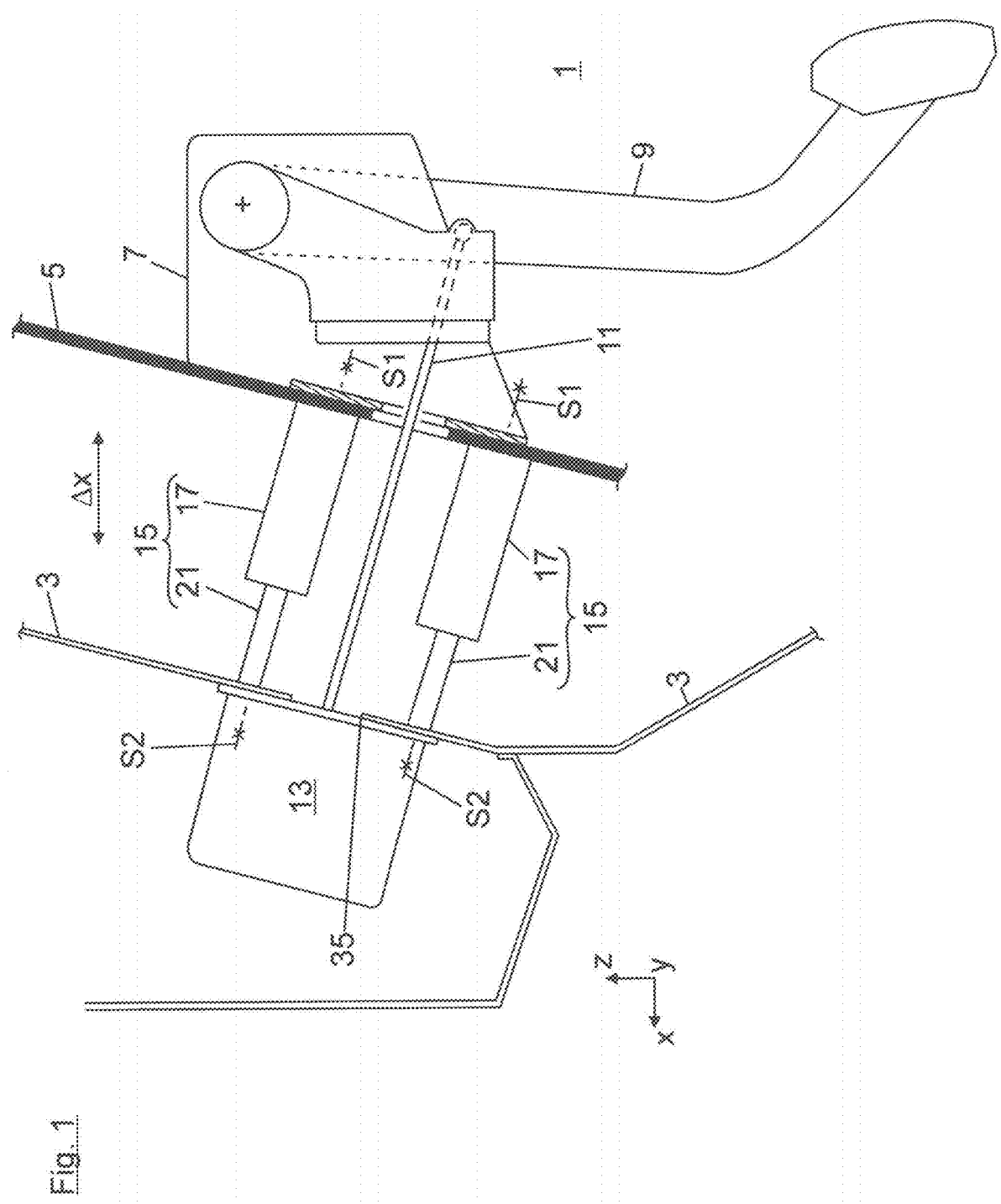
FIG. 1 shows a vehicle securing arrangement in a first view.

In FIG. 1, a driver-side footwell 1 in a vehicle interior of a two-track vehicle is delimited towards the front of the vehicle by a bulkhead 3. In the footwell 1 there is an auxiliary structure 5, on the rear side of which relative to the vehicle a pedal bracket 7 is mounted, which is part of a foot lever system. Among other things, the brake pedal 9 is pivotally connected to the pedal bracket 7 and is in force-transmitting connection with a braking device 13 via an actuating rod 11. In FIG. 1, the braking device 13 is positioned on a front side of the bulkhead 3 relative to the vehicle, opposite the footwell 1. As can be seen from FIG. 1, the pedal bracket auxiliary structure 5 and the bulkhead 3 are spaced apart from each other by a longitudinal offset Δx.

Figure 2:
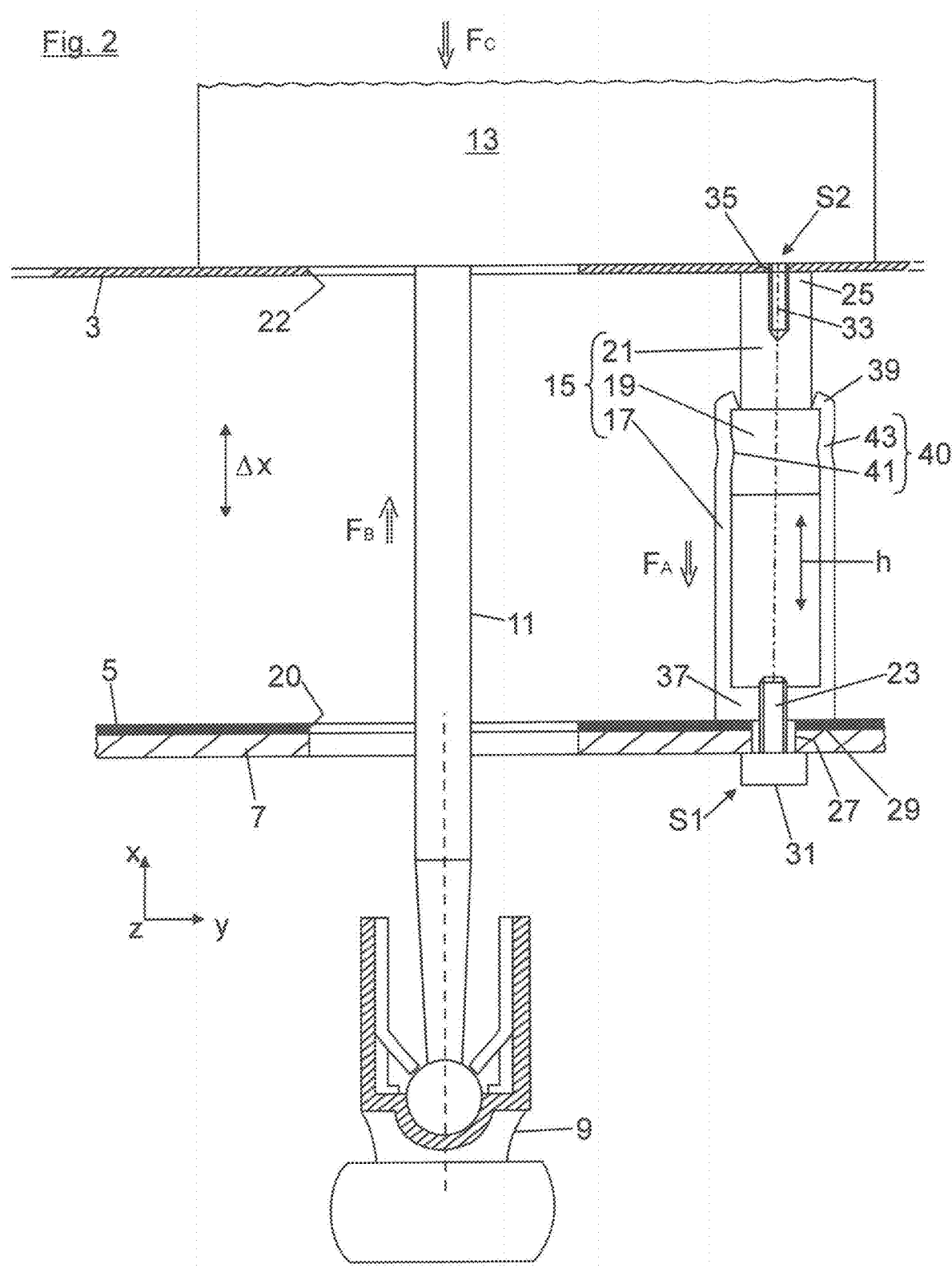
FIG. 2 shows a vehicle securing arrangement in a second view.
Figure 3:
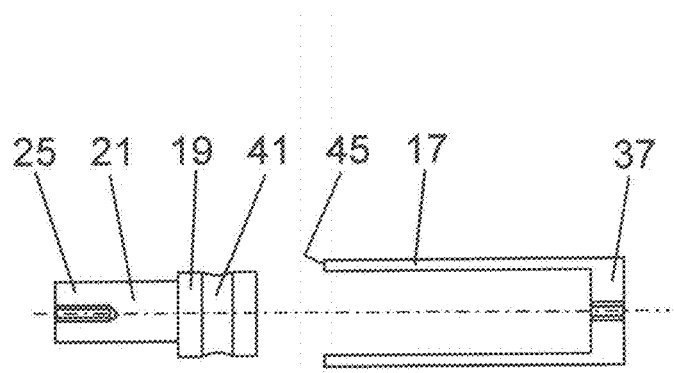
FIG. 3 is a view illustrating the manufacture of the spacer according to the invention.

The braking device 13 and the pedal bracket 7 are secured by means of two spacers 15, one of which is shown in sectional view in FIG. 2. This is realized as a piston-cylinder unit, which has a cylinder sleeve 17 with a piston 19 guided telescopically therein. The piston 19 is connected via its piston rod 21 to a screw point S2 at the front relative to the vehicle, while the cylinder sleeve 17 is connected to a screw point S1 at the rear relative to the vehicle. The rear screw point S1, relative to the vehicle, has a screw bolt 23 which is guided through a screw hole 27 of the pedal bracket 7 and through a screw hole 29 of the auxiliary structure 5 and is in threaded engagement with an internal thread of a cylinder base 37 of the cylinder sleeve 17 of the spacer 15. In this way, the pedal bracket 7 and the auxiliary structure 5 are clamped between the screw head 31 of the screw bolt 23 and the cylinder base 37 of the cylinder sleeve 17.

The screw point S2 at the front relative to the vehicle has a screw bolt 33 formed on the braking device 13, which is guided through a screw hole 35 in the bulkhead 3 and is screwed in threaded engagement with an internal thread on the piston rod head 25 of the spacer 15. In this way, the bulkhead 3 is clamped between a mounting surface of the braking device 13 and the piston rod head 25 of the spacer 15.

The actuating rod 11 is guided through an auxiliary structure passage 20 and through a bulkhead passage 22.

As can be seen from FIG. 2, the piston 19 is in contact with an end stop 39 of the cylinder sleeve 17 on the piston rod side. In addition, the piston 19 has a circumferential annular groove 41 into which a shaped threshold 43 of the sleeve wall of the cylinder sleeve 17 projects in a form-fitting manner, namely by forming a form-fitting connection 40 which can be released in the event of a crash.

When the brake pedal is actuated during normal driving, the actuating rod 11 presses with an actuating force $F_B$ in the direction of the front braking device 13 relative to the vehicle. In this case, the two spacers 15 act as rigid tension anchors, each of which provides a tensile force path between the braking device 13 and the pedal bracket 7. In the traction force path, a compensating force $F_A$ counteracting the actuating force $F_B$ builds up, whereby the auxiliary structure 5 and the bulkhead 3 are relieved of force. When the actuating force $F_B$ is applied, the piston 19 is pressed in the pulling direction with the compensating force $F_A$ against the end stop 39 of the cylinder sleeve 17, so that no stroke adjustment of the piston 19 occurs within the cylinder sleeve 17.

In a frontal crash, the following situation arises: A crash force $F_C$ directed towards the rear of the vehicle acts on the braking device 13. In this case, the two spacers 15 are subjected to compression. Under such a compressive load, the spacers 15 are no longer rigid but rather flexible. The impact of the crash force $F_C$ releases the positive connection 40 and releases a crash stroke h, over which the piston 19 can move telescopically within the cylinder sleeve 17. In this way, in the event of a crash, the two spacers 15 do not act as component-rigid block formers that are displaced in the direction of the vehicle interior.

Figure 4:
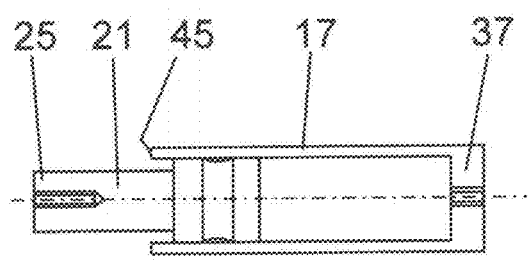
FIG. 4 is a view illustrating the manufacture of the spacer according to the invention.
Figure 5:
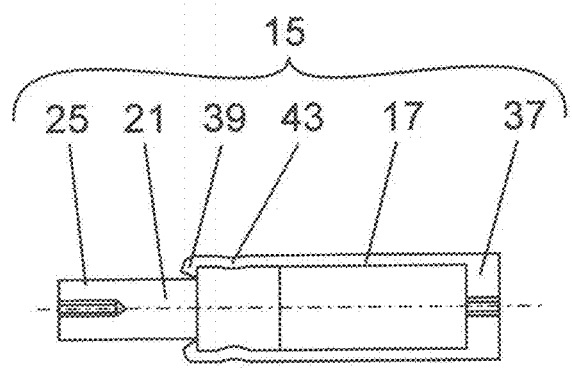
FIG. 5 is a view illustrating the manufacture of the spacer according to the invention.

In the following, a manufacturing process of a spacer 15 according to the invention is indicated by way of example with reference to FIGS. 4 to 6: Accordingly, firstly the piston 15 together with the piston rod 21 is inserted into the cylinder sleeve 17 through an insertion opening 45 on the front side. Subsequently, the insertion opening 45 of the cylinder sleeve 17 is folded over (i.e. caulked) for example by cold forming or the cylinder sleeve 17 is tapered in the area of its insertion opening 45, namely with the formation of an end stop 39 with a reduced diameter. The piston 19 is brought into contact with the end stop 39. In the further course of the process, for example by cold forming/cold forging, the material of the cylinder sleeve 17 is pressed into the circumferential annular groove 41 of the piston 19 to form a forming threshold 43 in order to realize the detachable positive connection 40 between the piston 19 and the cylinder sleeve 17.

The invention claimed is:

1. A vehicle securing arrangement, with a brake pedal which is articulated on a pedal bracket and which is connected to a braking device in a force-transmitting manner via an actuating rod, wherein the braking device is arranged on a front side, relative to the vehicle, of a braking device support structure, and the pedal bracket is arranged on a rear side, relative to the vehicle, of a pedal bracket support structure which is spaced from the braking device support structure by a longitudinal offset, wherein the securing arrangement has at least one spacer which bridges the longitudinal offset between the brake device support structure and the pedal bracket support structure and which is connected at a first end thereof to the brake device support structure and which is connected at a second end thereof to the pedal bracket support structure, and that the spacer is connected to the brake device at a front joint, relative to the vehicle, and is connected to the pedal bracket at a rear joint, relative to the vehicle, so that, when the brake pedal is actuated, the spacer acts as a component-rigid tension anchor in the vehicle's longitudinal direction, which provides a tensile force path between the brake device and the pedal bracket, in which a compensating force counteracting the actuating force builds up.

2. The vehicle securing arrangement according to claim 1, wherein in the event of a frontal crash, a crash force directed towards the rear of the vehicle acts on the braking device, so that the spacer is subjected to pressure, and is configured to yield under pressure load.

3. The vehicle securing arrangement according to claim 2, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

4. The vehicle securing arrangement according to claim 2, wherein, in the case of a frontal crash, the spacer acts as a deformation element which can be deformed in the vehicle longitudinal direction and which absorbs crash energy while being deformed.

5. The vehicle securing arrangement according to claim 4, wherein the spacer is a piston-cylinder unit with a cylinder sleeve and a piston guided telescopically therein, wherein the piston is connected via its piston rod to the one joint, and the cylinder sleeve is connected to the other joint.

6. The vehicle securing arrangement according to claim 4, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

7. The vehicle securing arrangement according to claim 2, wherein the spacer is a piston-cylinder unit with a cylinder sleeve and a piston guided telescopically therein, wherein the piston is connected via its piston rod to the one joint, and the cylinder sleeve is connected to the other joint.

8. The vehicle securing arrangement according to claim 7, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

9. The vehicle securing arrangement according to claim 7, wherein, in the event of a crash, the piston is stroke-adjustable in the compression direction over a crash stroke distance in the cylinder sleeve, and/or in that in normal driving operation the piston is pressed in the tension direction by the compensating force against a mechanical stop of the cylinder sleeve.

10. The vehicle securing arrangement according to claim 9, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

11. The vehicle securing arrangement according to claim 9, wherein, in the event of a crash, the piston is adjustable over the crash stroke distance with deformation of the piston and/or the cylinder sleeve in such a way that the crash stroke distance can only be released as soon as the acting crash force exceeds a predefined limit value.

12. The vehicle securing arrangement according to claim 11, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

13. The vehicle securing arrangement according to claim 1, wherein the spacer is supported with its end faces on the pedal bracket support structure and on the brake device support structure, and in that, at a rear screw point relative to the vehicle, the pedal bracket is clamped with the spacer with the pedal bracket support structure in between, and/or in that, at a front screw point relative to the vehicle, the brake device is clamped with the spacer with the brake device support structure in between.

14. The vehicle securing arrangement according to claim 13, wherein, at the front screw point relative to the vehicle, the brake device is screwed to the piston rod head of the spacer with the brake device support structure in between, and/or that at the rear screw point, relative to the vehicle, the pedal bracket is screwed to a cylinder base of the cylinder sleeve of the spacer with the pedal bracket support structure in between.

15. The vehicle securing arrangement according to claim 14, wherein in normal driving operation the piston is in contact with a piston rod-side end stop of the cylinder sleeve, whereby a piston movement is prevented when the spacer is subjected to a tensile load.

16. The vehicle securing arrangement according to claim 15, wherein the piston is in a positive connection with the sleeve wall of the cylinder sleeve, which inhibits a crash stroke movement of the piston, and in that by the action of the crash force the positive connection can be released and the crash stroke distance is released, and wherein for forming the positive connection the piston has a circumferential annular groove into which a shaped threshold of the sleeve wall of the cylinder sleeve projects in a form-fitting manner.

17. The vehicle securing arrangement according to claim 14, wherein the piston is in a positive connection with the sleeve wall of the cylinder sleeve, which inhibits a crash stroke movement of the piston, and in that by the action of the crash force the positive connection can be released and the crash stroke distance is released, and wherein for forming the positive connection the piston has a circumferential annular groove into which a shaped threshold of the sleeve wall of the cylinder sleeve projects in a form-fitting manner.

\* \* \* \* \*